United States Patent [19]

Jackson

[11] Patent Number: 4,800,672
[45] Date of Patent: Jan. 31, 1989

[54] CENTRALIZED FUMIGATION SYSTEM FOR EXTERMINATING INSECTS IN A BUILDING

[76] Inventor: John C. Jackson, 313 S. Lakeside Dr., Lake Worth, Fla. 33460

[21] Appl. No.: 52,289

[22] Filed: May 21, 1987

[51] Int. Cl.$^4$ .......................... A01M 13/00
[52] U.S. Cl. ..................................... 43/125
[58] Field of Search ............... 43/124, 132.1, 125; 52/168

[56] References Cited

U.S. PATENT DOCUMENTS

| | | | |
|---|---|---|---|
| 1,861,736 | 6/1932 | Bersie | 43/125 |
| 2,842,892 | 7/1958 | Aldridge | 43/124 |
| 2,915,848 | 12/1959 | Griffin | 43/124 |
| 2,981,025 | 4/1961 | Woodson | 43/124 |
| 3,513,586 | 5/1970 | Meyer | 43/124 |
| 3,676,949 | 7/1972 | Ramsey | 43/124 |
| 3,782,026 | 1/1974 | Bridges | 43/124 |
| 4,028,841 | 6/1977 | Lundwall | 43/124 |

Primary Examiner—Gene P. Crosby
Attorney, Agent, or Firm—John H. Faro

[57] ABSTRACT

This invention relates to a novel built-in centralized system for exterminating insects in a building, and particularly to such a system which may be installed during construction without modification, interruption or departure from traditional building design and/or techniques. This system includes a common reservoir as a source of fumigating agent, valve structure for controlling the flow of fumigant into a distribution network incorporated into the structure of the building and, preferably, structure for programming the system. This system may be used in both residential and industrial buildings.

15 Claims, 3 Drawing Sheets

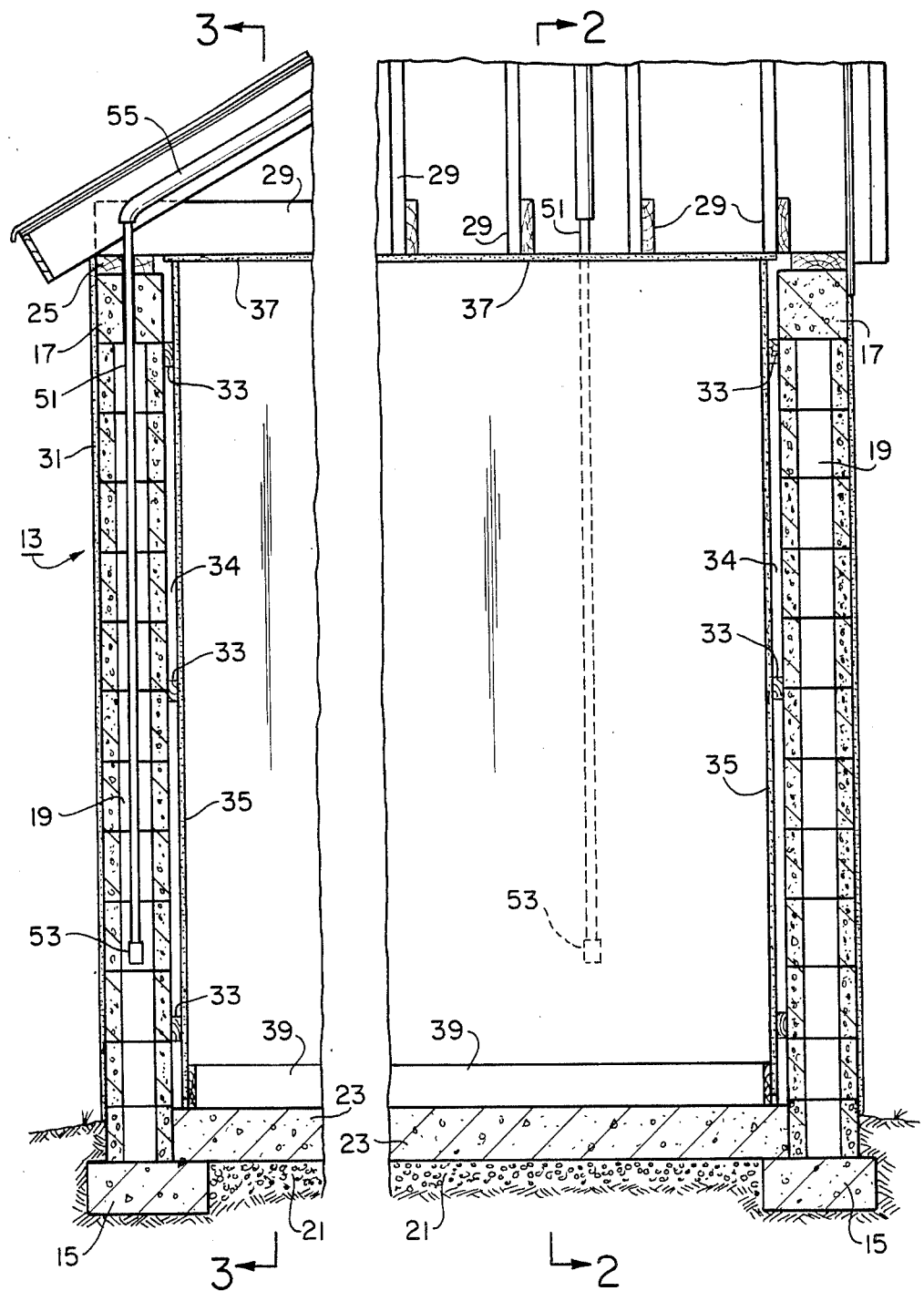

CENTRALIZED FUMIGATION SYSTEM FOR EXTERMINATING INSECTS IN A BUILDING

BACKGROUND OF THE INVENTION

1. Field of the Invention

This invention is directed to a novel system for exterminating insects in a building. More specifically, this invention involves a centralized fumigation system which is built into a building, and which may provide controlled fumigation of the building at programmed intervals.

2. Description of the Prior Art

All over the world, insects are undesirable inhabitants in homes, commercial buildings, and industrial buildings for many obvious reasons. As a result, many systems have been suggested to rid these buildings of these insects. In Florida, where the climate is both warm and humid, insects invade the buildings, even when all of the outside walls and foundations are made of concrete and are sealed on the outside surfaces.

Some contemporary methods of exterminating infestations of insects in homes and places of business include spraying the perimeters of the rooms and buildings with insecticide, and/or fogging the rooms and even the entire buildings with insecticide. Such methods are temporary, are only partially successful and involve a great waste of time, money and chemicals.

It is a fact that cockroaches, silver fish, palmetto bugs, etc., live and multiply in the walls of the buildings. Spraying the baseboards and the perimeters of the rooms and/or fogging entire rooms only reaches a small part of the insect population. Insects simply return into their nests in and between the interior and exterior walls of the buildings, deep in the structure of the buildings, where they are protected from such insecticide treatment and continue to live and multiply.

Other contemporary methods attempt to prevent invasions by insects by applying liquid insecticide to the foundation below the grade through the hollows in the concrete block foundation wall, as described for example, in U.S. Pat. Nos. 2,915,848 to James H. Giffin and U.S. Pat. No. 3,513,586 to G. P. Meyer, et al. Such methods are only partially successful in providing a barrier to the invasion of insects, but do little toward eradicating nests of insects in the walls where the insects live and multiply.

OBJECTS OF THE INVENTION

It is an object of this invention to provide a novel fumigation system for exterminating insects in a building.

It a particular object of this invention is to provide an insect-extermination system which treats the problem at its source rather than treats its symptoms.

It is a further object of this invention is to provide an insect-extermination system which can be installed in the building while the building is being constructed.

It is a further object of this invention is to provide an insect-extermination system whose component parts and whose installation are compatible with current practical construction practice.

Another object of this invention is to provide a built-in extermination system that can be fed with insecticide and operated automatically at programmed intervals.

Another object of this invention is to provide a built-in extermination system which applies insecticides into the voids in the walls of the building and not into the living or working spaces of the building.

Still another object of this invention is to provide a fumigation system which applies fumigant into the voids in the walls of a building and not into the living or working spaces of a building.

Another object of this invention is to provide a fumigation system that applies fumigant into the voids in the walls of a building and which takes advantage of the ability of the active ingredients of the fumigant to diffuse through the walls into the places where insects nest.

SUMMARY OF THE INVENTION

The above and related objects of this invention are achieved by providing a novel built-in, centralized, fumigation system for exterminating insects which is amenable to installation in a building during the construction thereof. The novel system is particularly adapted for installation in a common type of CBS construction; that is, construction in which the outside wall includes a load-bearing portion of hollow concrete blocks. The wall typically includes a horizontal concrete tie beam across the top of the wall for tieing together the wall and for sealing off the hollow cores of the blocks. The wall may include a sealer coating (stucco) on the exterior surface and an interior wall of plasterboard closely spaced from the interior surface of the exterior wall forming a space therebetween where insects may live.

The novel fumigation system includes distribution means for transferring fumigant under pressure from a common reservoir, which can be placed outside of the building or in the garage into the hollow cores of the wall. The object of this fumigation system is to distribute a controlled and effective dosage of fumigant into the hollow cores of the exterior walls. This distribution means includes a plurality of tubular means through the tie beam across the top of the wall into the hollow cores. A fogging nozzle is operatively connected to each tubular means inside the hollow cores. The distribution means also includes means for controlling the transfer of fumigant from the reservoir into the tubular means which have been placed in the exterior wall during the construction of the building. Each tubular means is solid and extends down the hollow cores so that the fogging nozzle can release fumigant near the bottom of the wall where it diffuses through the porous-block exterior wall and ultimately into the space between the exterior wall and its associated interior wall. By introducing fumigant as a fog into the hollow cores of the wall, the active ingredients of the fumigant can travel to the nests in the wall where the insects live and multiply.

The blocks of the wall are known to be porous so that the active ingredients of the fumigtant can penetrate through the blocks into the space behind the interior wall. Since the fumigant is contained in the wall, all of it is used as a fumigant and little or none is lost or blown away as in prior fumigation systems.

In one form of the novel system, a plurality of tubular means extend vertically through the tie beam at the top of the wall into the hollow cores of the wall with a separate fogging nozzle in the cores at the end of each tubular means. The other end of each tubular means is connected to one of several headers which, in turn is connected by rigid tubing or flexible hose to a common selector valve having a single input pipe and a plurality of output pipes, each of which is connected to one of the tubings or hoses. The selector valve, which receives fumigant under pressure at its input pipe, may distribute the fumigant to each of the output pipes either simultaneously or sequentially. The selector valve may be operated manually or by a timer for regular timed distributions.

BRIEF DESCRIPTION OF THE DRAWINGS

FIG. 2 is a sectional, elevational view of an outside wall of the building shown in FIG. 1 and viewed along section lines 2—2 of FIG. 3.

FIG. 3 is a sectional elevational view of an outside wall of a building shown in FIG. 1 viewed along section lines 3—3 of FIG. 2.

DESCRIPTION OF THE INVENTION INCLUDING THE PREFERRED EMBODIMENTS

Figure 1:
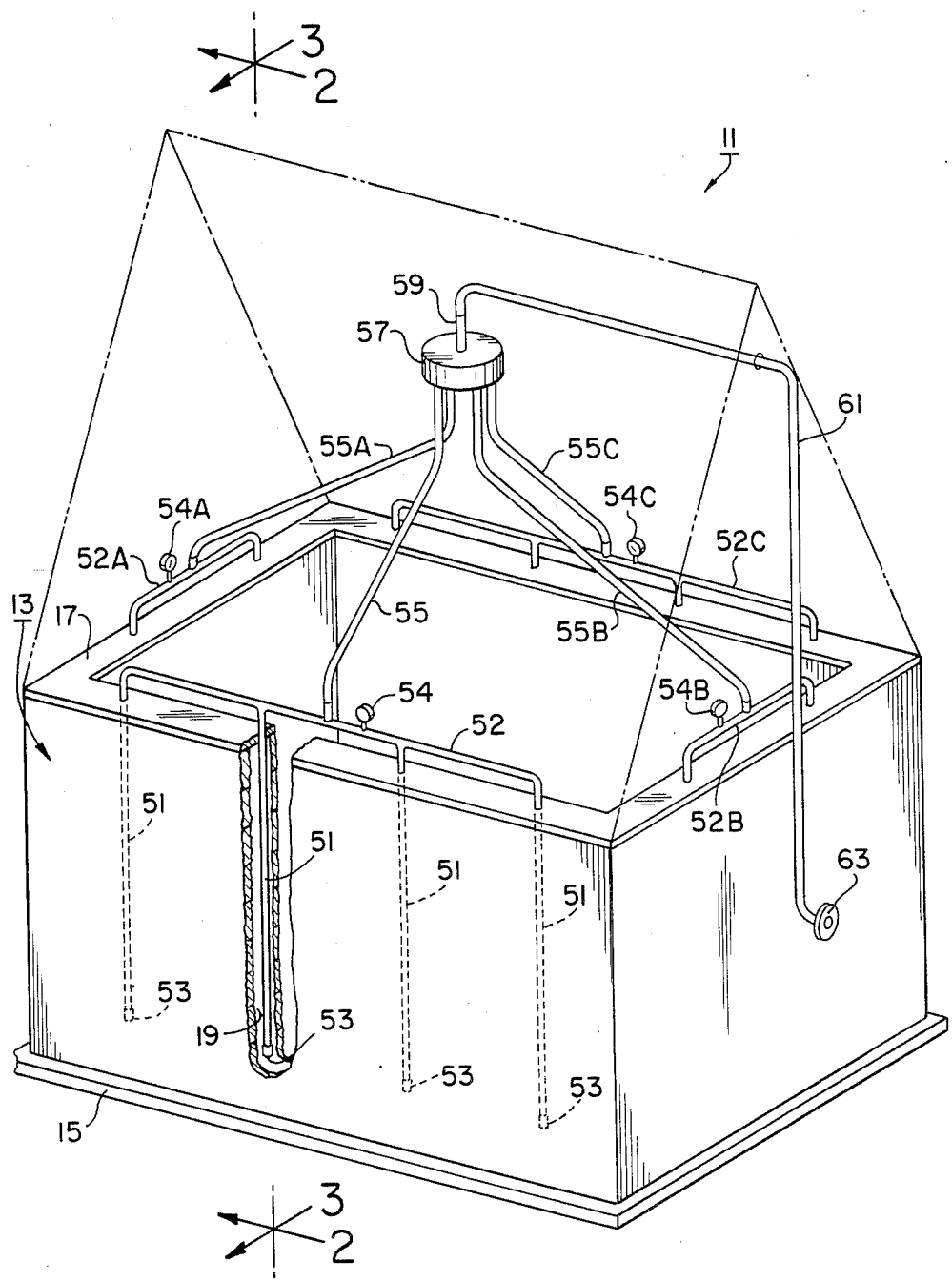
FIG. 1 is a partially broken-away schematic, perspective view of a building showing the layout of a preferred embodiment of the novel system.
Figure 4:
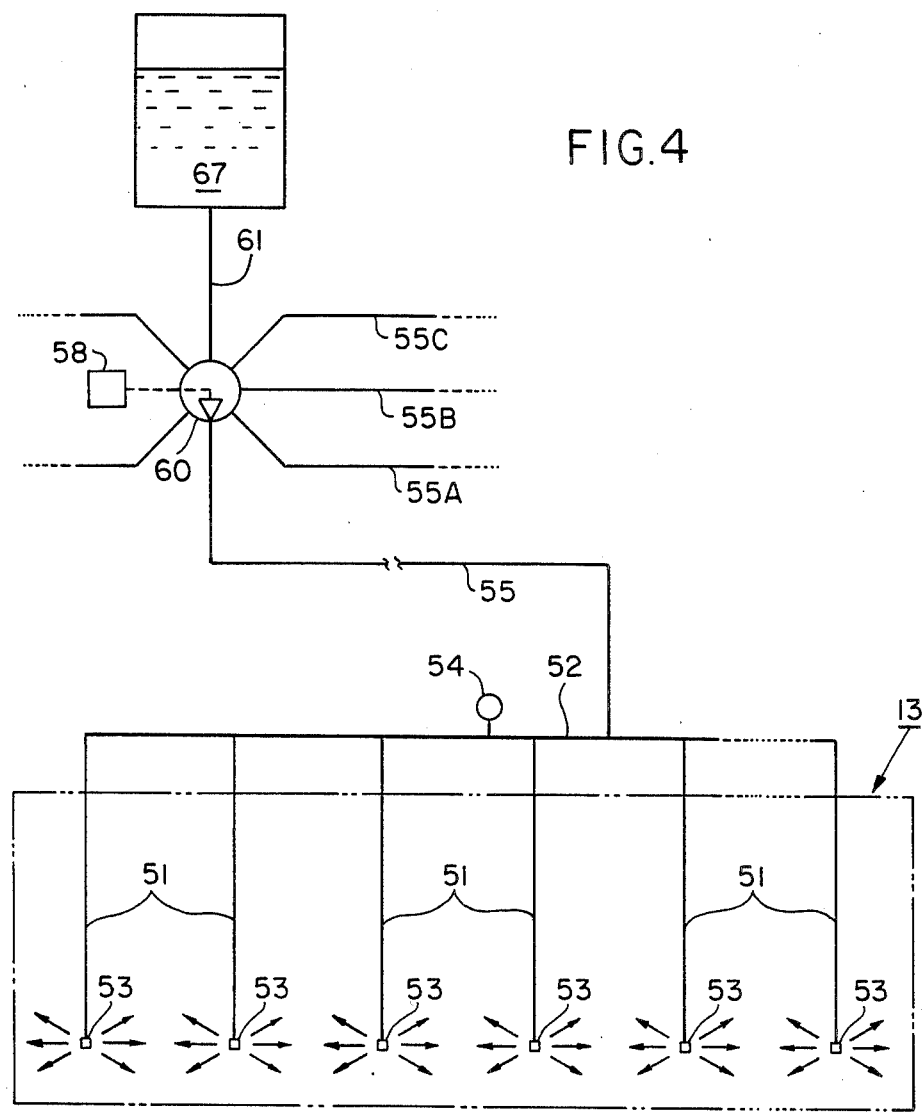
FIG. 4 is a schematic piping diagram for the preferred embodiment of the novel system shown in FIGS. 1 to 3.

The following description of some of the preferred embodiments of the concepts of this invention is made in reference to the accompanying figures. The individual elements of these figures may be presented in more than one figure, and thus, they are assigned a common reference numeral for simplification of identification and understanding.

FIGS. 1, 2 and 3 show a common construction for a building (11) including an outside exterior wall (13). The exterior wall (13) is made of hollow concrete blocks which rest on a reinforced concrete footer (15) which serves as a lower tie beam. An upper tie beam (17) rests on the upper edge of the concrete blocks. The hollows of the concrete blocks are aligned one above the other providing extended vertical hollow cores or voids (19). The upper and lower tie beams (15 and 17) serve to tie the wall together and to seal both ends of the vertical voids (19). A layer of gravel (21) fills the entire volume between the footers (15) of the building and a concrete floor (23) rests on the gravel layer (21) and the footer (15). A wooden plate (25) is bolted to the upper tie beam (17) and roof trusses (29) rest on the plate (25). There is a sealer layer (31) of a special cement mix on the outer surface of the exterior wall (13). Furring strips (33) are nailed to the inner surface of the exterior wall (13) and an interior wall (35) of plaster wallboard is attached to the furring strips (33). A ceiling layer (37) of plaster wallboard is attached to the bottoms of the roof trusses (29). A wooden baseboard (39) attaches to the interior wall (35) around the base thereof.

For the preferred embodiment of the novel system, shown in FIGS. 1 to 4, each exterior wall (13) has a plurality of vertical fogging means comprising tubular means or tubes (51) of plastic or metal which pass through the upper tie beam (17) into the voids (19) at spaced intervals; for example, six or so feet apart. Each tube (51) has a fogging nozzle (53) at the end thereof in the voids (19), preferably near the bottoms of the voids. The other end of each tube (51) in the front wall (13) is connected to a tubular header (52) having a pressure gauge (54). Each header (52) is connected by flexible hose or rigid pipe (55) to the output pipes (not shown) of a control means (57), which may be installed in the attic of the building (11). The tubes (51) in each of the other walls are connected to a similar separate header (52A), (52B), (52C), each having a separate pressure gauge (54A), (54B), (54C) respectively, connected to output pipes of the distribution control means (57). The distribution control means (57) has a single input pipe (59) which is connected to a supply pipe (61) which leads outside the building (11) and terminates in a connection means (63) for connecting to a source of fumigant under pressure. The distribution means (57) can be operated manually or automatically with a selector valve (60) and can be made to distribute fumigant to the fogging tubes (55) to (55C) either serially or simultaneously. In one arrangement there can be a low voltage transformer, a timer and a timer switch (58) located in the building where the homeowner or the business owner may conveniently set a time to have the building fogged by day or by night. If the source of fumigant (67), which is the connection means (63), is a container that has sufficient capacity, it will only need to be replaced or refilled once every six (6) months or so by the pest control service man at a minimal cost to the property owner.

The unique part of this invention is that it does not involve costly changes in the conventional construction of the building. It should add very little cost to the total purchase price of a building. It is much more effective in the fogging process.

It will allow property owners the convenience of having the structure fumigated without having a pest control company entering the building when no one is present. It is also a necessity for people who are allergic and don't like the smell of the fumigant to have the structure fumigated during the hours when the business or home is not occupied. The novel system allows the extermination process to keep the active ingredients of the fumigant in the inner structure of the walls or building where it will not be distributed on any carpet, furniture, foods, utensils, etc. This will make the building a safer and cleaner environment for children, pets and adults.

The foregoing figures and description thereof is provided as illustrative of the preferred embodiments of the concept of this invention. While these embodiments represent what is regarded as the best mode for the practice of this invention, they are not intended as delineating the scope of the concept, which is set forth in the following claims.

What is claimed is:

1. A fumigation system for a hollow-core concrete block exterior wall of a building, said wall including a horizontal concrete tie-beam across the top thereof for mechanically tying said wall together and also for sealing off the hollow cores of said wall, said fumigation system comprising distribution means for transferring fumigant under pressure from a common reservoir into said hollow cores, said distribution means including a plurality of tubular means through said tie beam across the top of said wall into said hollow cores, a fogging nozzle operatively connected to each of said tubular means in said hollow cores, and, means for controlling the transfer of fumigant under pressure from said reservoir into said tubular means.

2. The fumigation system defined in claim 1, wherein said cores extend vertically in said wall, the outside surface of said wall carrying a sealer coating, and the interior surface of said exterior wall carrying an interior wall of plasterboard spaced from the interior surface thereof.

3. The fumigation system defined in claim 1, wherein said concrete blocks are porous to said fumigant.

4. The fumigation system defined in claim 1, wherein said cores extend vertically in said walls, a plurality of said tubular means extend vertically through said tie beam into a different one of said cores, and a single nozzle is connected to each tubular means inside said hollow cores.

5. The fumigation system defined in claim 4, wherein said plurality of tubular means are operatively connected through a common header for introducing fumigant into said plurality of tubular means.

6. The fumigation system defined in claim 5, wherein said tubular means are solid, rigid tubes in and through the tie beam across the top of said wall, and said distribution means includes a tubular header connected to each of said rigid tubes, and a separate flexible hose connecting said header to a distribution control means having a single input pipe and a plurality of output pipes, said input pipe being connected to means for introducing fumigant under pressure into said distribution means.

7. The fumigation system defined in claim 6, wherein said distribution control means is located in the attic of said building.

8. A fumigation system adapted for installation into a plurality of exterior walls of a building during the construction thereof, each wall of the aforesaid installation comprising a plurality of hollow-core concrete blocks mortared together with their cores aligned to provide extended vertical cores, a sealer coating on the exterior surface of said wall, an upper tie beam along the top margin of said wall sealing the tops of said extended cores and a bottom tie beam along the bottom margin of said wall sealing the bottoms of said extended cores, said fumigation system comprising:

(a) a plurality of tubular means installed in said walls extending from outside said wall, through said upper tie beam into said extended cores, (b) a fogging nozzle operatively connected to each said tubular means, in said wall, (c) means for introducing fumigant with low vapor pressure into said tubular means connected to said tubular means outside said wall, and (d) means for controlling the transfer of fumigant under pressure from a reservoir thereof into said tubular means.

9. The fumigation system defined in claim 8, wherein said system comprises a plurality of tubular means extending vertically into a plurality of said vertical cores of said building, and a separate fogging nozzle operatively attached to each of said tubular means, said nozzle being located near the bottoms of said cores.

10. The fumigation system defined in claim 8, including means for introducing said fumigant into said tubular means by automatic control at regular timed intervals.

11. The fumigation system defined in claim 8, including means for introducing said fumigant into said tubular means by manual control.

12. The fumigation system defined in claim 8, wherein said system comprises a plurality of vertical tubes on each wall, each tube extending from outside said cores into said cores, a fogging nozzle operatively attached to each of said tubes inside said cores, a plurality of headers, each header being connected outside said cores to at least one of said tubes, all of said headers being connected to a common distribution control means.

13. The fumigation system defined in claim 12, wherein said distribution control means includes a selector valve for selectively introducing fumigant into said headers.

14. The fumigation system defined in claim 13, including timer means operatively connected to said selector valve for introducing said fumigant into said headers at predetermined times, and for predetermined intervals.

15. The fumigation system defined in claim 13, including timer means operatively connected to said selector valve for introducing said fumigant into said headers sequentially at predetermined timed intervals.

* * * * *